(12) United States Patent
Blue

(10) Patent No.: US 10,197,345 B2
(45) Date of Patent: Feb. 5, 2019

(54) LOW PRESSURE OIL COOLED COMPOSITE RAM BUSHING WITH SECONDARY COOLING

(71) Applicant: Rodney Adolph Blue, Huntington Beach, CA (US)

(72) Inventor: Rodney Adolph Blue, Huntington Beach, CA (US)

(73) Assignee: Stolle Machinery Company, LLC, Centennial, CO (US)

( * ) Notice: Subject to any disclaimer, the term of this patent is extended or adjusted under 35 U.S.C. 154(b) by 828 days.

(21) Appl. No.: 13/735,287

(22) Filed: Jan. 7, 2013

(65) Prior Publication Data

US 2013/0175023 A1 Jul. 11, 2013

Related U.S. Application Data

(60) Provisional application No. 61/583,235, filed on Jan. 5, 2012.

(51) Int. Cl.
| | |
|---|---|
| *F28F 27/02* | (2006.01) |
| *B30B 15/34* | (2006.01) |
| *B21D 37/16* | (2006.01) |
| *B21D 51/26* | (2006.01) |
| *F16C 37/00* | (2006.01) |

(52) U.S. Cl.
CPC ............. *F28F 27/02* (2013.01); *B30B 15/34* (2013.01); *B21D 37/16* (2013.01); *B21D 51/26* (2013.01); *F16C 37/00* (2013.01)

(58) Field of Classification Search
CPC .......... F28F 27/00; F28F 27/02; F01M 5/002; F01M 5/005; B21D 37/16; B21D 37/18

USPC .............. 165/281; 184/6.21, 6.22; 72/342.2, 72/342.3
See application file for complete search history.

(56) References Cited

U.S. PATENT DOCUMENTS

| | | | |
|---|---|---|---|
| 3,274,813 A | | 9/1966 | Aleck |
| 3,577,753 A | * | 5/1971 | Shah ..................... B21D 22/28 72/342.3 |
| 3,837,430 A | | 9/1974 | Decker et al. |
| 3,943,909 A | * | 3/1976 | Palmer ................. 123/196 AB |
| 4,209,079 A | | 6/1980 | Marchal et al. |
| 4,431,372 A | * | 2/1984 | Dadhich ....................... 415/175 |
| 4,465,383 A | * | 8/1984 | Heinemann et al. ......... 384/100 |
| 4,471,687 A | * | 9/1984 | Nightingale et al. ............. 92/62 |

(Continued)

FOREIGN PATENT DOCUMENTS

| | | | |
|---|---|---|---|
| EP | 1672189 | * | 12/2005 |
| JP | 2000-313000 | | 11/2000 |

(Continued)

OTHER PUBLICATIONS

Portela, EP1672189TRANS (English Translation), Dec. 2005.*

(Continued)

*Primary Examiner* — Eric S Ruppert
(74) *Attorney, Agent, or Firm* — Eckert Seamans Cherin & Mellott, LLC

(57) ABSTRACT

A low pressure system for cooling a ram bushing is provided. The low pressure system includes at least one check valve disposed on a T-coupling downstream of the low pressure pump. The check valve allows for the pressure to be maintained in the cooling system, but also allows pressure to be relieved in the event of an over pressure condition.

14 Claims, 1 Drawing Sheet

(56) References Cited

U.S. PATENT DOCUMENTS

| | | | |
|---|---|---|---|
| 4,502,313 A | | 3/1985 | Phalin et al. |
| 5,687,605 A | * | 11/1997 | Main .............................. 72/347 |
| 6,367,304 B1 | | 4/2002 | Fahrenbach |
| 7,000,445 B2 | * | 2/2006 | Hepner et al. .................. 72/349 |
| 7,413,054 B2 | * | 8/2008 | El-Ibiary ...................... 184/6.22 |
| 2002/0046905 A1 | | 4/2002 | Hulkkonen et al. |
| 2003/0084700 A1 | | 5/2003 | Blue |
| 2006/0065217 A1 | * | 3/2006 | Ikegawa .................... 123/41.42 |
| 2009/0126900 A1 | | 5/2009 | Scherer et al. |
| 2011/0162724 A1 | | 7/2011 | Kleckler |
| 2011/0239726 A1 | | 10/2011 | Crabtree |

FOREIGN PATENT DOCUMENTS

| | | | |
|---|---|---|---|
| JP | 2005-021979 | | 1/2005 |
| JP | 2010-233541 | | 10/2010 |
| WO | WO2010066606 | * | 6/2010 |

OTHER PUBLICATIONS

Stolle Machinery Company, LLC, Supplemental European Search Report EP13733593.1 (PCT/2013/020499), dated Oct. 29, 2015, 7 pages.

* cited by examiner

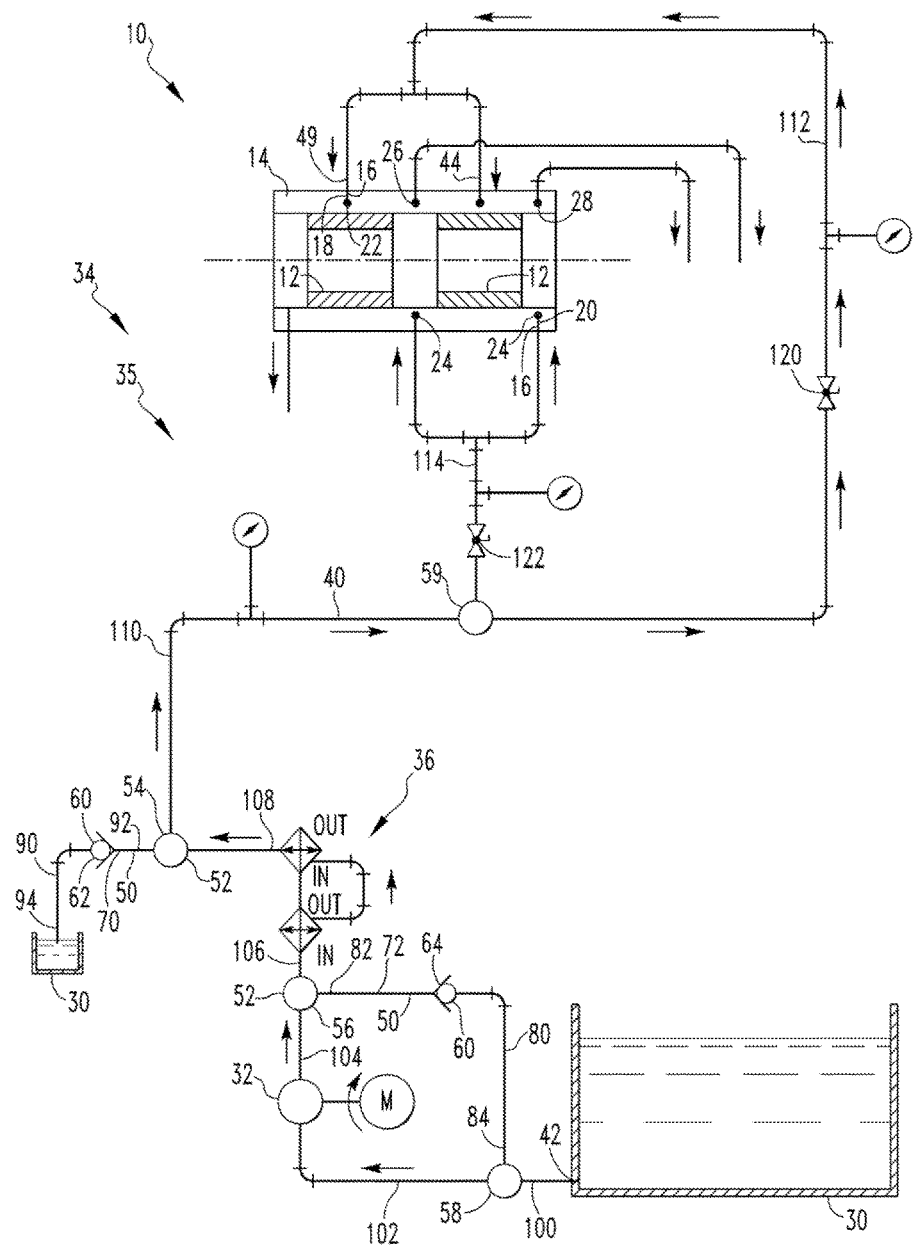

LOW PRESSURE OIL COOLED COMPOSITE RAM BUSHING WITH SECONDARY COOLING

CROSS REFERENCE TO RELATED APPLICATION

This application claims priority under 35 U.S.C. § 119(e) to U.S. Provisional Patent Application Serial No. 61/7583, 235, filed Jan. 5, 2012 entitled LOW PRESSURE COOLED COMPOSITE. RAM BUSHING WITH SECONDARY COOLING.

BACKGROUND OF THE INVENTION

Field of the Invention

This invention relates to a fluid cooling system for a ram bushing and, more specifically to a fluid cooling system utilizing a low pressure pump.

Background Information

The manufacture of certain containers, such as, but not limited to, aluminum cans, on a bodymaker typically includes a circular or cup-like blank that is disposed on a punch attached to a ram and passed through one or more dies. The friction created when the ram passes through the ram bushing causes the ram bushing to heat up. The heat in the ram bushing is reduced by passing a fluid, such as, but not limited to, oil, through the ram bushing.

Presently, such cooling systems utilize the bodymaker high pressure pump or high pressure system. The amount of fluid from the high pressure system that may be used for cooling is limited. That is, the cooling system provides cooling fluid at a rate of about 3 gpm and at an initial pressure of about 1,000 to 1,200 psi, which is reduced to about 50 psi to 150 psi at the ram bushing. The oil in the high pressure system, however, tends to be hot and the cooling properties of the fluid are limited. Further, a high pressure pump tends to be more expensive and prone to more degradation through use than the bodymaker low pressure pump or low pressure system. It would he desirable to utilize the low pressure system, but the low pressure system, typically, does not provide sufficient pressure or flow rate to effect cooling of the ram bushing. Alternatively, if the flow rate, or pressure, in the low pressure system is increased, the low pressure pump may draw too much power causing degradation to the pump or causing a circuit breaker to trip.

SUMMARY OF THE INVENTION

At least one embodiment of this invention allows the use of the low pressure system for cooling the ram bushing. The low pressure system of this invention includes at least one check valve disposed on a T-coupling downstream of the low pressure pump. The check valve allows for the pressure to be maintained in the cooling system, but also allows pressure to be relieved in the event of an over pressure condition. Such an over pressure condition may cause the low pressure pump to exceed its operational limits.

Cooling fluid, typically oil, is provided to the ram bushing via a primary cooling conduit. That is, the primary cooling conduit extends from a fluid reservoir to the ram bushing. A low pressure, and low current, pump, hereinafter a "low pressure pump," is disposed on the primary cooling conduit and is structure to pump a fluid therethrough. Preferably, there are two check valves disposed between the low pressure pump and the ram bushing. A first check valve is disposed on a T-coupling downstream of a heat exchanger, between the heat exchanger and the fluid reservoir. A second check valve is disposed on a T-coupling just downstream of the low pressure pump. The second check valve is disposed on a low pressure fluid bypass conduit that is further coupled to the primary cooling conduit at a location upstream and downstream of the low pressure pump. In this configuration, the fluid pressure in the primary cooling conduit is maintained at a pressure to provide a sufficient amount of cooling fluid to the ram bushing while allowing relief in the event of an over pressure condition.

BRIEF DESCRIPTION OF THE DRAWINGS

A full understanding of the invention can be gained from the following description of the preferred embodiments when read in conjunction with the accompanying drawings in which:

FIG. 1 is a schematic of the ram bushing cooling system.

DESCRIPTION OF THE PREFERRED EMBODIMENTS

As used herein, a "conduit" provides an enclosed passage for a fluid. The "conduit" may be a unitary construct, such as, but not limited to, a hose, or, the "conduit" may include multiple constructs, such as, but not limited to, a hose coupled to, and in fluid communication with, a passage in a housing.

As used herein, a "low pressure pump" is a pump structured to pump a fluid at a pressure of about 50 psi and at a rate of about 17 gpm. A "low pressure pump" utilizes a current of less than about 4 amps.

As used herein, a construct such as, but not limited to, a pump or valve "disposed on" a conduit means that the fluid in the conduit passes through, and may be affected by, the construct. For example, a pump "disposed on" a primary cooling conduit is structured to pump the fluid in the primary cooling conduit.

As used herein, "coupled" means a link between two or more elements, whether direct or indirect, so long as a link occurs.

As used herein, "directly coupled" means that two elements are directly in contact with each other.

As used herein, "fixedly coupled" or "fixed" means that two components are coupled so as to move as one while maintaining a constant orientation relative to each other. The fixed components may, or may not, be directly coupled.

As used herein, the word "unitary" means a component is created as a single piece or unit. That is, a component that includes pieces that are created separately and then coupled together as a unit is not a "unitary" component or body.

As shown in FIG. 1, a ram bushing cooling system 10 is structured to provide a cooling fluid to two ram bushings 12. The ram bearing cartridge 14 is structured to support one or more ram bushings 12 The ram bearing cartridge 14 includes internal passages 16 defining at least a primary cooling passage 18 and preferably a secondary cooling passage 20. The primary cooling passage 18 and secondary cooling passage 20 are independent passages through the ram bearing cartridge 14 and may each include a chamber (not shown) in the ram bearing cartridge 14. Each of the primary cooling passage 18 and secondary cooling passage 20 has an inlet. That is, the ram bushing 12 has at least one first cooling inlet 22 for the primary cooling passage 18 and at least one second cooling inlet 24 for the secondary cooling passage 20. The primary cooling passage 18 and secondary cooling passage 20 further each include a discharge port 26, 28. The at least one first cooling inlet 22, the at least one second cooling inlet 24, and the discharge ports 26, 28 are each structured to be coupled to, and in fluid communication with, a conduit structured to transport a fluid.

The ram bushing cooling system 10 includes a cooling fluid reservoir 30, (shown in FIG. 1 at two separate locations but preferably comprising a single reservoir) a low pressure pump 32, and a conduit system 34. A cooling fluid, such as, but not limited to, oil is stored in the cooling fluid reservoir 30. The conduit system 34 includes a plurality of conduits 35 and is structured to provide fluid communication between the low pressure pump 32 and the ram bushing at least one first cooling inlet 22. The conduit system 34 has at least a primary cooling conduit 40 and at least one side conduit 50. The primary cooling conduit 40 has a first end 42 and a second end 44. The primary cooling conduit first end 42 is coupled to, and provides fluid communication with, said cooling fluid reservoir 30. The primary cooling conduit second end 44 is structured to be coupled to, and in fluid communication with, said ram bushing at least one first cooling inlet 22. The low pressure pump 32 is disposed on said primary cooling conduit 40. The at least one side conduit 50 is coupled to, and in fluid communication with, said primary cooling conduit 40 at least one T-coupling 52. The conduit system 34 further includes at least one check valve 60 disposed on the at least one side conduit 50. The at least one check valve 60 is structured to allow a cooling fluid to pass through said at least one side conduit 50 upon the event of an over pressure condition downstream of said low pressure pump 32. The at least one side conduit 50 is, preferably, coupled to, and in fluid communication with, said primary cooling conduit 40 at a location downstream of said low pressure pump 32. Further, the conduit system 34 preferably includes at least one heat exchanger 36 for said cooling fluid. The at least one heat exchanger 36 is disposed on said primary cooling conduit 40. The at least one check valve 60 may be disposed either upstream or downstream from the at least one heat exchanger 36.

Preferably, the conduit system at least one side conduit 50 includes a first conduit 70 and a second conduit 72 and the at least one T-coupling 52 includes a first T-coupling 54 and a second T-coupling 56. The first conduit 70 is coupled to, and in fluid communication with, said primary cooling conduit 40 at the first T-coupling 54. The second conduit 72 is also coupled to, and in fluid communication with, said primary cooling conduit 40 at the second T-coupling 56. The at least one check valve 60 preferably includes two check valves, a first check valve 62 and a second check valve 64. The first check valve 62 is disposed on the first conduit 70. The first check valve 62 is structured to allow a cooling fluid to pass through said first conduit 70 thus maintaining the desired pressure required to the primary cooling conduit 40. The second check valve 64 is disposed on said second conduit 72. The second check valve 64 is also structured to allow a cooling fluid to pass through said second conduit 72 upon the event of an over pressure condition downstream of said low pressure pump 32. Preferably, the first check valve 62 is structured to allow fluid to pass at a first selected pressure with the first selected pressure being between about 50 psi and 150 psi. Preferably, the second check valve 64 is structured to allow fluid to pass at a second selected pressure with the second selected pressure being between about 60 psi and 150 psi.

More specifically, said conduit system 34 has a low pressure pump oil bypass conduit 80 and a heat exchanger system outlet relief conduit 90. The low pressure pump oil bypass conduit 80 has a first end 82 and a second end 84. The low pressure pump oil bypass conduit first end 82 is coupled to, and in fluid communication with, said primary cooling conduit 40 at second T-coupling 56. That is, the interface of low pressure pump oil bypass conduit first end 82 and primary cooling conduit 40 forms the second T-coupling 56. The second T-coupling 56 is at a location downstream of said low pressure pump 32, but upstream of the at least one heat exchanger 36. The low pressure pump oil bypass conduit second end 84 is coupled to, and in fluid communication with, said primary cooling conduit 40 at a location upstream of said low pressure pump 32 and downstream of the cooling fluid reservoir 30. The second check valve 64 is disposed on the low pressure pump oil bypass conduit 80. In this configuration, an over pressure condition downstream of said low pressure pump 32 causes the second check valve 64 to open and re-circulate cooling fluid through the low pressure pump 32 thereby lowering the pressure in the primary cooling conduit 40. That is, the second check valve 64 is disposed on said low pressure pump oil bypass conduit 80 and is structured to allow fluid to pass from said primary cooling conduit 40 at a location downstream of said low pressure pump 32 to said primary cooling conduit 40 at a location upstream of said low pressure pump 32 when the fluid pressure in said primary cooling conduit 40 exceeds a selected pressure.

The heat exchanger system outlet relief conduit 90 has a first end 91 and a second end 94. The heat exchanger system outlet relief conduit first end 92 is coupled to, and in fluid communication with, said primary cooling conduit 40 at a location downstream of at least one heat exchanger 36. More specifically, the interface of the heat exchanger system outlet relief conduit first end 92 and the primary cooling conduit 40 forms the first T-coupling 54. The heat exchanger system outlet relief conduit second end 94 is coupled to, and in fluid communication with, said cooling fluid reservoir 30. The first check valve 62 is disposed on said heat exchanger system outlet relief conduit 90 and is structured to allow fluid to pass from said primary cooling conduit 40 to said cooling fluid reservoir 30 when the fluid pressure in said primary cooling conduit exceeds a selected pressure. In this configuration, cooling fluid in the primary cooling conduit 40 does not pass into the cooling fluid reservoir 30 unless a selected pressure has been reached. Thus, the fluid pressure in the primary cooling conduit 40 is maintained at at least a minimum pressure. That is, the first check valve 62 provides a back pressure to the cooling fluid in the primary cooling conduit 40.

It will be appreciated that the function of check valve 62 is to create sufficient oil pressure in the cooling conduit 40 to ensure adequate oil flows to the ram bushing for cooling. By way of a non-limiting example, because the low pressure pump 32 will have a flow rate of about 17 gpm and the ram bearing will require only about 5 gpm, some oil will always pass through check valve 62 to conduit 90. Check valve 64 is used to protect the low pressure pump motor from overloading (e.g., excessive current) if the oil pressure at conduit 106 gets too high. This situation may occur, for example, when the oil is cold resulting in higher oil viscosity, which translates to higher oil pressure. Check valve 64 pressure rating will typically be higher than the rating for check valve 62, and normally no oil will bypass through check valve 64 unless the oil is cold.

As shown in FIG. 1, the primary cooling conduit 40 extends from the cooling fluid reservoir 30 to the ram bushing 12. The primary cooling conduit 40 includes a number of specific conduits. These conduits are, in order from upstream end to downstream end, the oil reservoir conduit 100, the low pressure pump inlet conduit 102, the low pressure pump outlet conduit 104, the heat exchanger inlet conduit 106, the heat exchanger outlet conduit 108, the main ram bushing inlet conduit 110 and the primary inlet conduit 112. There are several T-couplings 52 with associated conduits. As noted above, the first T-coupling 54 is disposed downstream of the at least one heat exchanger 36. At the first I-coupling 54 the heat exchanger outlet conduit 108 becomes the main ram bushing inlet conduit 110. The side conduit 50 is the heat exchanger system outlet relief conduit 90 discussed above. At the second T-coupling 56, disposed downstream of the low pressure pump 32, the low pressure pump outlet conduit 104 becomes the heat exchanger inlet conduit 106. The side conduit 50 is the low pressure pump oil bypass conduit 80 which loops back to join the oil reservoir conduit 100 at a third T-coupling 58. That is, at the third T-coupling 58 the oil reservoir conduit 100 becomes the low pressure pump inlet conduit 102 with the side conduit being the outlet side of the low pressure pump oil bypass conduit 80.

Further, the main ram bushing inlet conduit 110 includes a fourth T-coupling 59. At the fourth T-coupling 59 the main ram bushing inlet conduit 110 becomes the primary inlet conduit 112 with the side conduit being the secondary inlet conduit 114. The primary inlet conduit 112 is coupled to, and in fluid communication with, the at least one first cooling inlet 22. The secondary inlet conduit 114 is coupled to, and in fluid communication with, the at least one second cooling inlet 24. The discharge ports 26, 28 are coupled to, and in fluid communication with, discharge conduits (not shown) that are further coupled to, and in fluid communication with, the cooling fluid reservoir 30. Valves 120, 122 may be disposed on the primary inlet conduit 112 and the secondary inlet conduit 114.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A ram bushing cooling system for a ram bushing, said ram bushing having at least one first cooling inlet and at least one second cooling inlet, said cooling system comprising:
   a cooling fluid reservoir;
   a low pressure pump;
   a conduit system structured to provide fluid communication between said low pressure pump and said ram bushing at least one first cooling inlet, said conduit system having a plurality of conduits including at least a primary cooling conduit, a secondary inlet conduit, and at least one side conduit;
   said low pressure pump disposed on said primary cooling conduit;
   said at least one side conduit coupled to, and in fluid communication with, said primary cooling conduit at a T-coupling;
   said secondary inlet conduit coupled to, and in fluid communication with, said ram bushing at least one second cooling inlet; and
   at least one check valve disposed on said at least one side conduit, said at least one check valve structured to allow a cooling fluid to pass through said at least one side conduit upon the event of an over pressure condition downstream of said low pressure pump.

2. The cooling system of claim 1 wherein:
said primary cooling conduit includes a first end and a second end, said primary cooling conduit first end coupled to, and providing fluid communication with, said cooling fluid reservoir, said primary cooling conduit second end coupled to, and in fluid communication with, said ram bushing at least one first cooling inlet.

3. The cooling system of claim 1 wherein:
said at least one side conduit being coupled to, and in fluid communication with, said primary cooling conduit at a location downstream of said low pressure pump.

4. The cooling system of claim 1 wherein:
said conduit system at least one side conduit includes a first conduit and a second conduit, said first and second conduit each coupled to, and in fluid communication with, said primary cooling conduit at a T-coupling;
said at least one check valve includes two check valves, a first check valve and a second check valve;
said first check valve disposed on said first conduit, said first check valve structured to allow a cooling fluid to pass through said first conduit upon the event of an over pressure condition downstream of said low pressure pump; and
said second check valve disposed on said second conduit, said second check valve structured to allow a cooling fluid to pass through said second conduit upon the event of an over pressure condition downstream of said low pressure pump.

5. The cooling system of claim 4 wherein:
said first check valve structured to allow fluid to pass at a first selected pressure; and
said second check valve structured to allow fluid to pass at a second selected pressure.

6. The cooling system of claim 5 wherein said second selected pressure is higher than said first selected pressure.

7. The cooling system of claim 1 wherein:
said conduit system includes at least one heat exchanger for said cooling fluid, said at least one heat exchanger disposed on said primary cooling conduit; and
wherein said at least one check valve is disposed either upstream or downstream from said at least one heat exchanger.

8. The cooling system of claim 1 wherein:
said conduit system includes at least one heat exchanger for said cooling fluid, said at least one heat exchanger disposed on said primary cooling conduit; and
wherein said at least one check valve is disposed downstream from said at least one heat exchanger.

9. The cooling system of claim 1 wherein:
said conduit system includes at least one heat exchanger for said cooling fluid, said at least one heat exchanger disposed on said primary cooling conduit;
said conduit system having a low pressure pump oil bypass conduit and a heat exchanger system outlet relief conduit;
said at least one check valve including a first check valve and a second check valve;
said low pressure pump oil bypass conduit having a first end and a second end, said low pressure pump oil bypass conduit first end being coupled to, and in fluid communication with, said primary cooling conduit at a location downstream of said low pressure pump, said low pressure pump oil bypass conduit second end being coupled to, and in fluid communication with, said primary cooling conduit at a location upstream of said low pressure pump;

said second check valve disposed on said low pressure pump oil bypass conduit and structured to allow fluid to pass from said primary cooling conduit at a location downstream of said low pressure pump to said primary cooling conduit at a location upstream of said low pressure pump when the fluid pressure in said primary cooling conduit exceeds a selected pressure;

said heat exchanger system outlet relief conduit having a first end and a second end, said heat exchanger system outlet relief conduit first end being coupled to, and in fluid communication with, said primary cooling conduit at a location downstream of at least one heat exchanger, said heat exchanger system outlet relief conduit second end being coupled to, and in fluid communication with, said cooling fluid reservoir; and said first check valve disposed on said heat exchanger system outlet relief conduit and structured to allow fluid to pass from said primary cooling conduit to said cooling fluid reservoir when the fluid pressure in said primary cooling conduit exceeds a selected pressure.

10. The cooling system of claim 9 wherein:
said first check valve structured to allow fluid to pass at a first selected pressure; and
said second check valve structured to allow fluid to pass at a second selected pressure.

11. The cooling system of claim 10 wherein said second selected pressure is higher than said first selected pressure.

12. The cooling system of claim 9 wherein:
said primary cooling conduit includes a heat exchanger outlet conduit, a main ram bushing inlet conduit, and a primary inlet conduit;
said heat exchanger outlet conduit coupled to, and in fluid communication with, said at least one heat exchanger;
said main ram bushing inlet conduit coupled to, and in fluid communication with, said heat exchanger outlet conduit;
said main ram bushing inlet conduit further coupled to, and in fluid communication with, a fourth T-coupling;
said primary inlet conduit coupled to, and in fluid communication with, said fourth T-coupling; and
said secondary inlet conduit coupled to, and in fluid communication with, said fourth T-coupling.

13. The cooling system of claim 1 wherein:
said primary cooling conduit includes a main ram bushing inlet conduit, and a primary inlet conduit;
said main ram bushing inlet conduit coupled to, and in fluid communication with, a fourth T-coupling;
said primary inlet conduit coupled to, and in fluid communication with, said fourth T-coupling; and
said secondary inlet conduit coupled to, and in fluid communication with, said fourth T-coupling.

14. A ram bushing cooling system for a ram bushing, said ram bushing having at least one first cooling inlet and at least one second cooling inlet, said cooling system comprising:
a cooling fluid reservoir;
a low pressure pump;
a conduit system structured to provide fluid communication between said low pressure pump and said ram bushing at least one first cooling inlet, said conduit system having a plurality of conduits including at least a primary cooling conduit, a secondary inlet conduit, and at least one side conduit;
said at least one side conduit includes a second conduit;
said low pressure pump disposed on said primary cooling conduit;
said at least one side conduit coupled to, and in fluid communication with, said primary cooling conduit at a T-coupling;
said secondary inlet conduit coupled to, and in fluid communication with, said ram bushing at least one second cooling inlet;
at least one check valve disposed on said at least one side conduit, said at least one check valve structured to allow a cooling fluid to pass through said at least one side conduit upon the event of an over pressure condition downstream of said low pressure pump;
said conduit system includes at least one heat exchanger for said cooling fluid, said at least one heat exchanger disposed on said primary cooling conduit;
said conduit system at least one side conduit includes a low pressure pump oil bypass conduit and a heat exchanger system outlet relief conduit;
each of said low pressure pump oil bypass conduit and said second conduit each coupled to, and in fluid communication with, said primary cooling conduit at a T-coupling;
said at least one check valve includes two check valves, a first check valve and a second check valve;
said low pressure pump oil bypass conduit having a first end and a second end, said low pressure pump oil bypass conduit first end being coupled to, and in fluid communication with, said primary cooling conduit at a location downstream of said low pressure pump, said low pressure pump oil bypass conduit second end being coupled to, and in fluid communication with, said primary cooling conduit at a location upstream of said low pressure pump;
said heat exchanger system outlet relief conduit having a first end and a second end, said heat exchanger system outlet relief conduit first end being coupled to, and in fluid communication with, said primary cooling conduit at a location downstream of at least one heat exchanger, said heat exchanger system outlet relief conduit second end being coupled to, and in fluid communication with, said cooling fluid reservoir;
said first check valve disposed on said heat exchanger system outlet relief conduit and structured to allow fluid to pass from said primary cooling conduit to said cooling fluid reservoir when the fluid pressure in said primary cooling conduit exceeds a selected pressure; and
said second check valve disposed on said low pressure pump oil bypass conduit and structured to allow fluid to pass from said primary cooling conduit at a location downstream of said low pressure pump to said primary cooling conduit at a location upstream of said low pressure pump when the fluid pressure in said primary cooling conduit exceeds a selected pressure.

\* \* \* \* \*

UNITED STATES PATENT AND TRADEMARK OFFICE
CERTIFICATE OF CORRECTION

PATENT NO. : 10,197,345 B2  
APPLICATION NO. : 13/735287  
DATED : February 5, 2019  
INVENTOR(S) : Rodney Adolph Blue Page 1 of 1

It is certified that error appears in the above-identified patent and that said Letters Patent is hereby corrected as shown below:

In the Specification

Column 1, Line 9, "No. 61/7583," should read --No. 61/583,--.
Column 1, Line 11, "COMPOSITE. RAM" should read --COMPOSITE RAM--.
Column 1, Line 64, "structure" should read --structured--.
Column 2, Line 55, "12 The" should read --12. The--.
Column 5, Line 8, "I-coupling 54" should read --T-coupling 54--.

Signed and Sealed this  
Nineteenth Day of March, 2019

Andrei Iancu  
*Director of the United States Patent and Trademark Office*